US012728392B2

(12) United States Patent
Noda et al.

(10) Patent No.: US 12,728,392 B2
(45) Date of Patent: Sep. 8, 2026

(54) ZEOLITE MEMBRANE COMPLEX, METHOD OF PRODUCING ZEOLITE MEMBRANE COMPLEX, SEPARATOR, MEMBRANE REACTOR, AND SEPARATION METHOD

(71) Applicant: NGK INSULATORS, LTD., Nagoya-City (JP)

(72) Inventors: Kenichi Noda, Nagoya-City (JP); Naoto Kinoshita, Nagoya-City (JP); Ryotaro Yoshimura, Kasugai-City (JP)

(73) Assignee: NGK INSULATORS, LTD., Nagoya-City (JP)

( * ) Notice: Subject to any disclaimer, the term of this patent is extended or adjusted under 35 U.S.C. 154(b) by 760 days.

(21) Appl. No.: 17/453,023

(22) Filed: Nov. 1, 2021

(65) Prior Publication Data

US 2022/0047995 A1 Feb. 17, 2022

Related U.S. Application Data

(63) Continuation of application No. PCT/JP2020/023107, filed on Jun. 11, 2020.

(30) Foreign Application Priority Data

Jun. 17, 2019 (JP) ................................ 2019-111809
May 11, 2020 (WO) ................. PCT/JP2020/018846

(51) Int. Cl.
*B01D 67/00* (2006.01)
*B01D 53/22* (2006.01)
(Continued)

(52) U.S. Cl.
CPC ....... *B01D 67/0051* (2013.01); *B01D 53/228* (2013.01); *B01D 69/108* (2022.08);
(Continued)

(58) Field of Classification Search
CPC ............. B01D 67/0051; B01D 53/228; B01D 19/2475; B01D 69/108; B01D 71/0281;
(Continued)

(56) References Cited

U.S. PATENT DOCUMENTS 8,540,802 B2 * 9/2013 Yaghi ...................... C01G 9/00 95/131
9,403,120 B2 * 8/2016 He ........................ B01D 71/32
(Continued)

FOREIGN PATENT DOCUMENTS

CN 104150503 A 11/2014
JP 2014-058433 A 4/2014
(Continued)

OTHER PUBLICATIONS

Li et al. (SAPO-34 membranes for CO2/CH4 separations: Effect of Si/Al ratio, 2008, vol. 110, pp. 310-317) (Year: 2008).*
(Continued)

*Primary Examiner* — Youngsul Jeong
(74) *Attorney, Agent, or Firm* — Muncy, Geissler, Olds & Lowe, P.C.

(57) ABSTRACT

A zeolite membrane complex includes a porous support and a zeolite membrane formed on the support. The zeolite membrane contains Al, P, and a tetravalent element. The composition of the zeolite membrane measured by X-ray photoelectron spectroscopy is such that the molar ratio of the tetravalent element to Al is higher than or equal to 0.01 and lower than or equal to 0.5, the molar ratio of P to Al is higher than or equal to 0.5 and lower than 1.0, and the total molar ratio of P and the tetravalent element to Al is higher than or equal to 0.9 and lower than or equal to 1.3. The zeolite membrane contains a zeolite crystal with an accessible volume higher than or equal to 450 $Å^3$.

17 Claims, 3 Drawing Sheets

(51) Int. Cl.
*B01D 69/10* (2006.01)
*B01D 71/02* (2006.01)
*B01J 19/24* (2006.01)
*C01B 39/48* (2006.01)

(52) U.S. Cl.
CPC ...... *B01D 71/0281* (2022.08); *B01J 19/2475* (2013.01); *C01B 39/48* (2013.01); *B01D 2323/24* (2013.01); *C01P 2002/85* (2013.01); *C01P 2006/16* (2013.01)

(58) Field of Classification Search
CPC . B01D 2323/24; C01B 39/48; C01P 2002/85; C01P 2006/16
See application file for complete search history.

(56) References Cited

U.S. PATENT DOCUMENTS

| | | | | |
|---|---|---|---|---|
| 2015/0010704 | A1 | 1/2015 | Hagio et al. | |
| 2017/0296983 | A1* | 10/2017 | Noda | B01D 69/147 |
| 2020/0023319 | A1 | 1/2020 | Hagio et al. | |
| 2020/0030753 | A1 | 1/2020 | Hagio et al. | |
| 2020/0101419 | A1 | 4/2020 | Noda et al. | |
| 2020/0101426 | A1 | 4/2020 | Noda et al. | |

FOREIGN PATENT DOCUMENTS

| | | | |
|---|---|---|---|
| WO | 2013/106571 | A1 | 7/2013 |
| WO | 2013/147327 | A1 | 10/2013 |
| WO | 2018/180563 | A1 | 10/2018 |
| WO | 2018/180564 | A1 | 10/2018 |
| WO | 2018/225325 | A1 | 12/2018 |
| WO | 2018/225793 | A1 | 12/2018 |

OTHER PUBLICATIONS

Funke et al. (Separating molecules by size in SAPO-34 membranes, Journal of Membrane Science 456 (2014) 185-191) (Year: 2014).*

Chen et al. (Silicoaluminophosphate No. eighteen (SAPO-18): a new microporous solid acid catalyst, Catalysis Letters 28 (1994) 241-248) (Year: 1994).*

Chen et al._2 (SAPO-18 Catalysts and Their Br0nsted Acid Sites, J. Phys. Chem. 1994, 98, 10216-10224) (Year: 1994).*

Emrani et al. (Effect of Synthesis Parameters on Phase Purity, Crystallinity and Particle Size of SAPO-34, Iran. J. Chem. Chem. Eng., vol. 30, No. 4, 2011) (Year: 2011).*

Abdollahi et al. (Effects of static and stirring aging on physiochemical properties of SAPO-18 and its performance in MTO process, Journal of Natural Gas Science and Engineering 22 (2015) 245-251) (Year: 2015).*

English translation of the International Preliminary Report on Patentability (Chapter I) dated Dec. 30, 2021 (Application No. PCT/JP2020/023107).

Shiguang Li, et al., "Scale-UP of SAPO-34 Membranes for $CO_2$/$CH_4$ Separation," *Journal of Membrane Science*, vol. 352, Issues 1-2, Apr. 15, 2010, pp. 7-13.

Shiguang Li, et al., "SAPO-34 Membranes for $CO_2$/$CH_4$ Separations: Effect of Si/Al Ratio," *Microporous and Mesoporous Materials*, vol. 110, Issues 2-3, Apr. 15, 2008, pp. 310-317.

International Search Report and Written Opinion (Application No. PCT/JP2020/023107) dated Jul. 14, 2020 (with English translation).

German Office Action (with English translation) dated Jul. 9, 2025 (Application No. 11 2020 002 909.3).

* cited by examiner

ZEOLITE MEMBRANE COMPLEX, METHOD OF PRODUCING ZEOLITE MEMBRANE COMPLEX, SEPARATOR, MEMBRANE REACTOR, AND SEPARATION METHOD

CROSS-REFERENCE TO RELATED APPLICATION

The present application is a continuation application of International Application No. PCT/JP2020/023107 filed on Jun. 11, 2020, which claims the benefit of priority to Japanese Patent Application No. JP2019-111809 filed on Jun. 17, 2019 and PCT international application No. PCT/JP2020/018846 filed on May 11, 2020. The entire contents of these applications are incorporated herein by reference.

TECHNICAL FIELD

The present invention relates to a zeolite membrane complex and a method of producing the zeolite membrane complex and also relates to separation of a mixture of substances using the zeolite membrane complex.

BACKGROUND ART

Various studies and developments are currently underway on forming a zeolite membrane on a porous support to obtain a zeolite membrane complex and using the molecular-sieving function of the zeolite in applications such as separation or adsorption of specific molecules. For example, in the case of separating a mixture of substances including a plurality of types of gases or liquids, the mixture of substances is fed to a zeolite membrane complex and a substance having high permeability is separated from other substances by allowing the substance with high permeability to permeate through the zeolite membrane complex.

International Publication No. 2018/225793 (Document 1) discloses a dehydrator that selectively separates water from a mixture of substances containing water, using an ALPO-type zeolite membrane (ALPO-17) having an ERI-type crystal structure. International Publications No. 2018/180563 (Document 2) and No. 2018/180564 (Document 3) disclose techniques for separating a mixed gas containing $CO_2$ and $CH_4$, using an SAPO-type zeolite membrane (SAPO-56) having an AFX-type crystal structure. Shiguang Li et al., Scale-up of SAPO-34 membranes for $CO_2/CH_4$ separation, Journal of Membrane Science, 2010, 352, 7-13 (Document 4) discloses a technique for separating a mixed gas containing $CO_2$ and $CH_4$, using an SAPO-type zeolite membrane (SAPO-34) having a CHA-type crystal structure.

In the case of ALPO-type zeolite membranes, there is a limit to the improvement in permeability of polar molecules because the zeolite membranes have relatively low affinity with polar molecules. It is thus conceivable to improve the permeability of polar molecules by introducing a tetravalent element such as silicon into the zeolite framework of an ALPO-type zeolite membrane, but this requires not only simply introducing the tetravalent element, but also adequately controlling the site of introduction of the tetravalent element. However, the control of the site of introduction of the tetravalent elements is not easy when the zeolite membrane is synthesized with the introduction of the tetravalent element, because the synthesis of the zeolite is conducted on the support, unlike in the case of introducing a tetravalent element during synthesis of zeolite powder.

SUMMARY OF INVENTION

The present invention is intended for a zeolite membrane complex, and it is an object of the present invention to improve permeability of polar molecules in a zeolite membrane.

A zeolite membrane complex according to one preferable embodiment of the present invention includes a porous support, and a zeolite membrane formed on the support. The zeolite membrane contains aluminum, phosphorus, and a tetravalent element. A composition of the zeolite membrane measured by X-ray photoelectron spectroscopy is such that a molar ratio of the tetravalent element to the aluminum is higher than or equal to 0.01 and lower than or equal to 0.5, a molar ratio of the phosphorus to the aluminum is higher than or equal to 0.5 and lower than 1.0, and a total molar ratio of the tetravalent element and the phosphorus to the aluminum is higher than or equal to 0.9 and lower than or equal to 1.3. The zeolite membrane complex can thus exhibit improved permeability of polar molecules.

Preferably, the composition of the zeolite membrane measured by X-ray photoelectron spectroscopy is such that the molar ratio of the tetravalent element to the aluminum is higher than or equal to 0.01 and lower than or equal to 0.3, and the molar ratio of the phosphorus to the aluminum is higher than or equal to 0.7 and lower than 1.0.

Preferably, the zeolite membrane contains a zeolite crystal with a pore diameter less than or equal to 0.4 nm.

Preferably, the zeolite membrane contains a zeolite crystal with an accessible volume higher than or equal to 450 $Å^3$.

Preferably, the zeolite membrane is composed of an AEI-, AFX-, or SAT-type zeolite.

Preferably, the tetravalent element is one or more types of elements selected from among silicon and titanium. More preferably, the tetravalent element is silicon.

Preferably, a ratio of a helium permeance to a $CF_4$ permeance is higher than or equal to 500, the helium permeance being measured with a single component helium under a pressure of 0.2 MPa on a supply side and a pressure of 0.1 MPa on a permeation side, and the $CF_4$ permeance being measured with a single component $CF_4$ under a pressure of 0.5 MPa on the supply side and a pressure of 0.1 MPa on the permeation side.

Preferably, the support is an alumina sintered body, a mullite sintered body, or a titania sintered body.

The present invention is also intended for a method of producing a zeolite membrane complex. A method of producing a zeolite membrane complex according to one preferable embodiment of the present invention includes a) preparing a precursor solution by adding at least an aluminum source, a phosphorus source, and a structure-directing agent to a solvent, b) generating a starting material solution containing a sol whose particle diameters are less than or equal to 500 nm, by retaining the precursor solution for 3 hours or more on conditions that a pH is higher than or equal to 5 and lower than or equal to 11 and that a temperature is higher than or equal to 10° C. and lower than or equal to 50° C., and c) immersing a porous support in the starting material solution to form a zeolite membrane on the support by hydrothermal synthesis. The zeolite membrane contains aluminum, phosphorus, and a tetravalent element. A composition of the zeolite membrane measured by X-ray photoelectron spectroscopy is such that a molar ratio of the tetravalent element to the aluminum is higher than or equal to 0.01 and lower than or equal to 0.5, a molar ratio of the phosphorus to the aluminum is higher than or equal to 0.5 and lower than 1.0, and a total molar ratio of the tetravalent element and the phosphorus to the aluminum is higher than or equal to 0.9 and lower than or equal to 1.3. This method of producing a zeolite membrane complex makes it possible to improve permeability of polar molecules in the zeolite membrane complex.

The present invention is also intended for a separator. A separator according to one preferable embodiment of the present invention includes the zeolite membrane complex described above, and a supply part that supplies a mixture of substances containing a plurality of types of gases or liquids to the zeolite membrane complex. The zeolite membrane complex separates a high permeability substance having high permeability in the mixture of substances from other substances.

Preferably, the high permeability substance is one or more types of substances selected from among $NH_3$, $CO_2$, and $H_2O$.

Preferably, the high permeability substance is $H_2O$.

The present invention is also intended for a membrane reactor. A membrane reactor according to one preferable embodiment of the present invention includes the zeolite membrane complex described above, a catalyst that accelerates a chemical reaction of a starting material, a reactor that includes the zeolite membrane complex and the catalyst, and a supply part that supplies the starting material to the reactor. The zeolite membrane complex separates a high permeability substance having high permeability in a mixture of substances from other substances by allowing the high permeability substance to permeate through the zeolite membrane complex, the mixture of substances containing a product substance generated by a chemical reaction of the starting material in the presence of the catalyst.

Preferably, the high permeability substance is one or more types of substances selected from among $NH_3$, $CO_2$, and $H_2O$.

Preferably, the high permeability substance is $H_2O$.

The present invention is also intended for a separation method. A separation method according to one preferable embodiment of the present invention includes d) preparing the zeolite membrane complex described above, and e) supplying a mixture of substances containing a plurality of types of gases or liquids to the zeolite membrane complex and separating a high permeability substance having high permeability in the mixture of substances from other substances by allowing the high permeability substance to permeate through the zeolite membrane complex.

Preferably, the high permeability substance is one or more types of substances selected from among $NH_3$, $CO_2$, and $H_2O$.

Preferably, the high permeability substance is $H_2O$.

These and other objects, features, aspects and advantages of the present invention will become more apparent from the following detailed description of the present invention when taken in conjunction with the accompanying drawings.

BRIEF DESCRIPTION OF DRAWINGS

FIG. 5 is an illustration of an apparatus that separates a mixture of substances; and.

DESCRIPTION OF EMBODIMENTS

Figure 1:
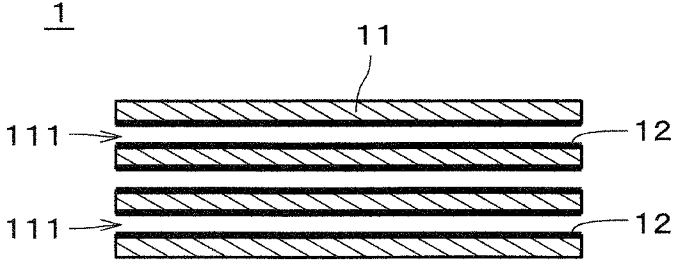
FIG. 1 is a sectional view of a zeolite membrane complex according to one embodiment.
Figure 2:
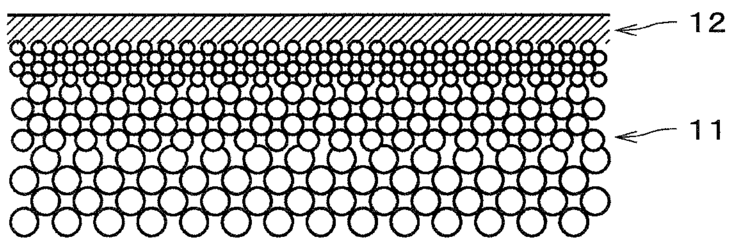
FIG. 2 is a sectional view of part of the zeolite membrane complex in enlarged dimensions.

FIG. 1 is a sectional view of a zeolite membrane complex 1. FIG. 2 is a sectional view of part of the zeolite membrane complex 1 in enlarged dimensions. The zeolite membrane complex 1 includes a porous support 11 and a zeolite membrane 12 formed on the support 11. The zeolite membrane 12 refers to at least a zeolite formed into a membrane on the surface of the support 11, and does not include zeolite particles that are merely dispersed in an organic membrane. The zeolite membrane 12 may contain two or more types of zeolites having different structures or different compositions. In FIG. 1, the zeolite membrane 12 is illustrated with bold lines. In FIG. 2, the zeolite membrane 12 is cross-hatched. In the illustration of FIG. 2, the zeolite membrane 12 has a thickness greater than an actual thickness.

The support 11 is a porous member permeable to gases and liquids. In the example illustrated in FIG. 1, the support 11 is a monolith support in which an integrally-molded column-like body has a plurality of through holes 111, each extending in a longitudinal direction (i.e., a right-left direction in FIG. 1). In the example illustrated in FIG. 1, the support 11 has a generally column-like shape. Each through hole 111 (i.e., cell) has, for example, a generally circular cross-sectional shape perpendicular to the longitudinal direction. In the illustration of FIG. 1, the through holes 111 have a diameter greater than an actual diameter, and the number of through holes 111 is smaller than an actual number. The zeolite membrane 12 is formed on the inside surfaces of the through holes 111 and covers approximately the entire inside surfaces of the through holes 111.

The support 11 has a length (i.e., length in the right-left direction in FIG. 1) of, for example, 10 cm to 200 cm. The support 11 has an outer diameter of, for example, 0.5 cm to 30 cm. The distance between the central axes of each pair of adjacent through holes 111 is, for example, in the range of 0.3 mm to 10 mm. The surface roughness (Ra) of the support 11 is, for example, in the range of 0.1 μm to 5.0 μm and preferably in the range of 0.2 μm to 2.0 μm. Alternatively, the support 11 may have a different shape such as a honeycomb shape, a flat plate-like shape, a tube-like shape, a cylinder-like shape, a column-like shape, or a polygonal prism shape. When the support 11 has a tube- or cylinder-like shape, the thickness of the support 11 is, for example, in the range of 0.1 mm to 10 mm.

As the material for the support 11, any of various substances (e.g., ceramic or metal) may be employed as long as the substance has chemical stability in the step of forming the zeolite membrane 12 on the surface. In the present embodiment, the support 11 is formed of a ceramic sintered compact. Examples of the ceramic sintered compact to be selected as the material for the support 11 include alumina, silica, mullite, zirconia, titania, yttrium, silicon nitride, and silicon carbide. In the present embodiment, the support 11 contains at least one of alumina, silica, and mullite.

The support 11 may contain an inorganic binder. The inorganic binder may be at least one of titania, mullite, easily sinterable alumina, silica, glass frit, clay minerals, and easily sinterable cordierite.

The support 11 has a mean pore diameter of, for example, 0.01 μm to 70 μm and preferably 0.05 μm to 25 μm. The mean pore diameter of the support 11 in the vicinity of the surface on which the zeolite membrane 12 is formed is in the range of 0.01 μm to 1 μm and preferably in the range of 0.05

μm to 0.5 μm. The mean pore diameter may be measured by, for example, a mercury porosimeter, a perm porosimeter, or a nano-perm porosimeter. As to a pore size distribution of the support 11 as a whole including the surface and inside of the support 11, D5 is in the range of, for example, 0.01 μm to 50 μm, D50 is in the range of, for example, 0.05 μm to 70 μm, and D95 is in the range of, for example, 0.1 μm to 2000 μm. The porosity of the support 11 in the vicinity of the surface on which the zeolite membrane 12 is formed is, for example, in the range of 20% to 60%.

The support 11 has, for example, a multilayer structure in which a plurality of layers with different mean pore diameters are laminated one above another in a thickness direction. A surface layer that includes the surface on which the zeolite membrane 12 is formed has a smaller mean pore diameter and a smaller sintered particle diameter than the other layers. The mean pore diameter in the surface layer of the support 11 is, for example, in the range of 0.01 μm to 1 μm and preferably in the range of 0.05 μm to 0.5 μm. When the support 11 has a multilayer structure, the material for each layer may be any of the substances described above. The plurality of layers forming the multilayer structure may be formed of the same material, or of different materials.

The zeolite membrane 12 is a porous membrane with very small pores (microscopic pores). The zeolite membrane 12 can be used as a separation membrane that separates a specific substance from a mixture of substances including a plurality of types of substances, using a molecular-sieving function. The zeolite membrane 12 is less permeable to the other substances than to the specific substance. In other words, the zeolite membrane 12 exhibits a lower permeation flux for the other substances than for the specific substance described above.

The zeolite membrane 12 has a thickness of, for example, 0.05 μm to 30 μm, preferably 0.1 μm to 20 μm, and more preferably 0.5 μm to 10 μm. Increasing the thickness of the zeolite membrane 12 improves selectivity. Reducing the thickness of the zeolite membrane 12 improves permeance. The surface roughness (Ra) of the zeolite membrane 12 is, for example, less than or equal to 5 μm, preferably less than or equal to 2 μm, more preferably less than or equal to 1 μm, and yet more preferably less than or equal to 0.5 μm.

Pore diameters of zeolite crystals contained in the zeolite membrane 12 (hereinafter, simply referred to as the "pore diameters in the zeolite membrane 12") are, for example, greater than or equal to 0.2 nm and less than or equal to 0.4 nm and preferably greater than or equal to 0.25 nm and less than or equal to 0.35 nm. When the pore diameters in the zeolite membrane 12 are less than 0.2 nm, the amount of substances penetrating through the zeolite membrane may be reduced, whereas when the pore diameters in the zeolite membrane 12 are greater than 0.4 nm, the zeolite membrane may have inadequate substance selectivity. The pore diameters in the zeolite membrane 12 refer to the diameters (i.e., minor axes) of pores in the zeolite crystals constituting the zeolite membrane 12 in a direction approximately perpendicular to the maximum diameter of the pores (i.e., the major axis that is a maximum value of the distance between oxygen atoms). The pore diameters in the zeolite membrane 12 are smaller than the mean pore diameter in the surface of the support 11 on which the zeolite membrane 12 is formed.

When n is the maximum number of membered rings in the zeolite constituting the zeolite membrane 12, the minor axes of the n-membered ring pores are assumed to be the pore diameters in the zeolite membrane 12. When the zeolite has a plurality of types of n-membered ring pores where n is the same number, the minor axes of n-membered ring pores having the largest minor axis are assumed to be the pore diameters in the zeolite membrane 12. Not that an n-membered ring refers to a portion forming a cyclic structure as a result of each oxygen atom being bonded with T atoms described later, where n is the number of oxygen atoms constituting the framework of a pore. The n-membered ring also refers to a portion forming a through hole (channel), and does not include a portion that does not form any through hole. An n-membered ring pore refers to a pore formed of an n-membered ring. From the viewpoint of improving selectivity, a maximum number of membered rings in the zeolite contained in the zeolite membrane 12 described above is preferably 8 or less (e.g., 6 or 8).

The zeolite constituting the zeolite membrane 12 has, for example, an accessible volume higher than or equal to 450 $Å^3$, preferably higher than or equal to 500 $Å^3$, and more preferably higher than or equal to 550 $Å^3$. When the accessible volume of the zeolite membrane 12 is lower than 450 $Å^3$, the amount of substances permeating through the zeolite membrane may be reduced. The accessible volume of the zeolite membrane 12 refers to the volume of portions that are contiguous to all unit cells, out of the volume of the space accessible by water molecules, in the zeolite crystals constituting the zeolite membrane 12.

The accessible volume and pore diameters of the zeolite membrane are uniquely determined by the framework structure of the zeolite and can be obtained from values disclosed in the "Database of Zeolite Structures" by the International Zeolite Association, [online], from the Internet <URL:http://www.iza-structure.org/databases/>.

There are no particular limitations on the type of the zeolite constituting the zeolite membrane 12, and examples of the zeolite include AEI-, AEN-, AFN-, AFV-, AFX-, BEA-, CHA-, DDR-, ERI-, ETL-, FAU-(X-type, Y-type), GIS-, IHW-, LEV-, LTA-, LTJ-, MEL-, MFI-, MOR-, PAU-, RHO-, SOD-, and SAT-type zeolites. When the zeolite is an 8-membered ring zeolite (i.e., zeolite whose maximum number of oxygen membered rings is 8), examples of the zeolite include AEI-, AFN-, AFV-, AFX-, CHA-, DDR-, ERI-, ETL-, GIS-, IHW-, LEV-, LTA-, LTJ-, RHO-, and SAT-zeolites. The zeolite constituting the zeolite membrane 12 is preferably of an AEI-, AFX-, AFV-, GIS-, or SAT-type, and more preferably of an AEI-, AFX-, or SAT-type.

The zeolite constituting the zeolite membrane 12 contains aluminum (Al), phosphorus (P), and a tetravalent element as T atoms (i.e., atoms located in the center of an oxygen tetrahedron ($TO_4$) constituting the zeolite). The tetravalent element is preferably one or more types of elements selected from among silicon (Si), germanium (Ge), titanium (Ti), and zirconium (Zr), more preferably one or more types of elements selected from among Si and Ti, and yet more preferably Si. When the tetravalent element is Si, the zeolite constituting the zeolite membrane 12 may, for example, be an SAPO-type zeolite in which T atoms include Si, Al, and P, an MAPSO-type zeolite in which T atoms include magnesium (Mg), Si, Al, and P, or a ZnAPSO-type zeolite in which T atoms include zinc (Zn), Si, Al, and P. Some of the T atoms may be replaced by other elements. The zeolite constituting the zeolite membrane 12 may contain alkali metal. Examples of the alkali metal include sodium (Na) and potassium (K).

The composition of the zeolite membrane 12 can be evaluated by dividing the peak area intensity of each element, obtained when the surface of the zeolite membrane 12 is measured by X-ray photoelectron spectroscopy (XPS), by a relative sensitivity coefficient. The XPS measurement of the composition of the zeolite membrane 12 is conducted after the membrane surface is etched to approximately 1 nm with argon in order to exclude the influence of surface contamination. The conditions for the XPS measurement are deemed to include the following: the use of monochromatized AlKα rays as an X-ray source (300 W, concurrent use of a neutralizer gun), an analyzer with an aperture diameter of φ800 μm, charge correction reference by C1s at 284.8 eV, pass energy of 58.7 eV, and elapsed time for each element of four minutes.

A molar ratio of the above tetravalent element to Al in the above-described zeolite membrane 12 is higher than or equal to 0.01 and lower than or equal to 0.5. A molar ratio of P to Al in the zeolite membrane 12 is higher than or equal to 0.5 and lower than 1.0. A total molar ratio of P and the above tetravalent element to Al in the zeolite membrane 12 is higher than or equal to 0.9 and lower than or equal to 1.3. When the above tetravalent element is indicated by X, the composition of the zeolite membrane 12 satisfies $0.01 \leq X/Al \leq 0.5$, $0.5 \leq P/Al \leq 1.0$, and $0.9 \leq (X+P)/Al \leq 1.3$. Preferably, the composition of the zeolite membrane 12 satisfies $0.01 \leq X/Al \leq 0.3$ and satisfies $0.7 \leq P/Al \leq 1.0$.

When a zeolite membrane is produced with a material composition described in the experimental method of Document 4 given above (Shiguang Li et al., Scale-up of SAPO-34 membranes for $CO_2/CH_4$ separation, Journal of Membrane Science, 2010, 352, 7-13), the zeolite membrane fails to satisfy the conditions for the composition of the zeolite membrane 12 described above because particle diameters of the sol in the precursor solution do not become less than or equal to 500 nm.

In the zeolite membrane complex 1, the ratio of a helium permeance to a $CF_4$ permeance is preferably higher than or equal to 500, the helium permeance (in units of nmol/$m^2 \cdot s \cdot Pa$) being measured with a single component helium under a pressure of 0.2 MPa on the supply side and a pressure of 0.1 MPa on the permeation side, and the $CF_4$ permeance being measured with a single component $CF_4$ under a pressure of 0.5 MPa on the supply side and a pressure of 0.1 MPa on the permeation side.

Figure 3:
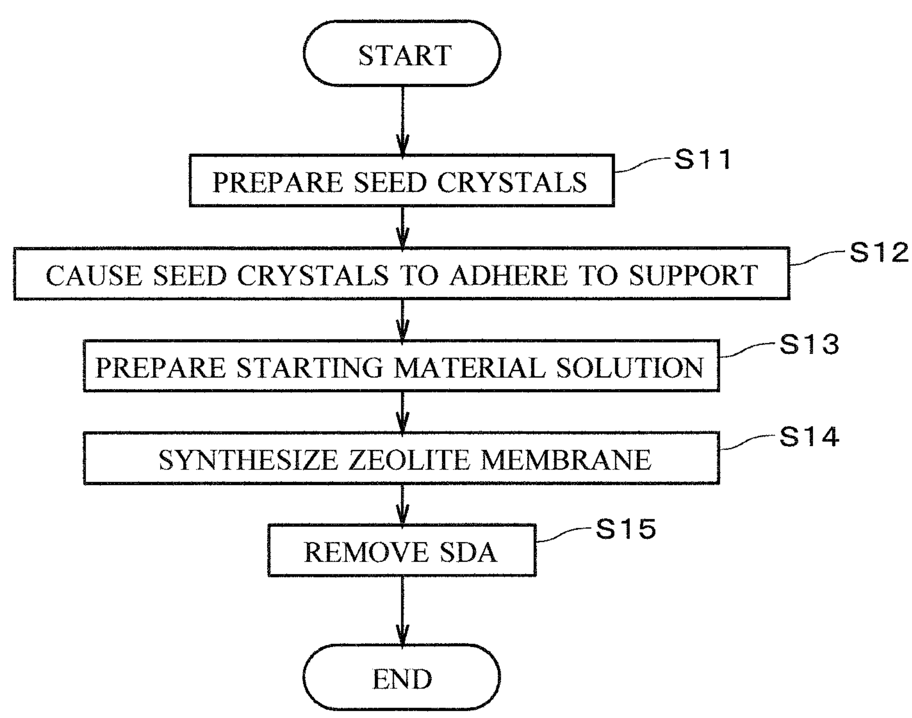
FIG. 3 is a flowchart of a procedure for producing the zeolite membrane complex.
Figure 4:
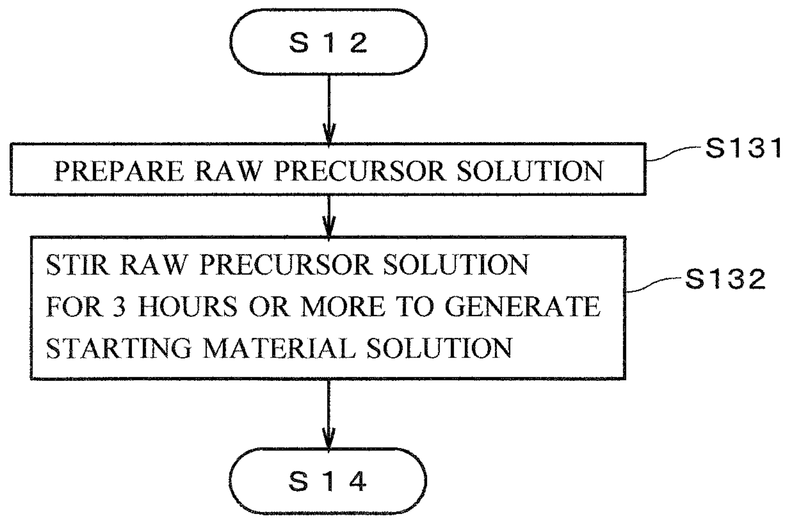
FIG. 4 is a flowchart of the procedure for producing the zeolite membrane complex.

Next, one example of the procedure for producing the zeolite membrane complex 1 will be described with reference to FIGS. 3 and 4. The following description is given on the assumption that the above tetravalent element contained in the zeolite membrane 12 is Si. In the production of the zeolite membrane complex 1, first, seed crystals for use in forming the zeolite membrane 12 are synthesized and prepared (step S11). In the synthesis of the seed crystals, a starting material solution is prepared by dissolving or dispersing, for example, an Si source, a P source, an Al source, and a structure-directing agent (hereinafter, also referred to as an "SDA") in a solvent.

Examples of the solvent in the starting material solution include water and alcohol such as ethanol. Examples of the Si source include colloidal silica, fumed silica, silicon alkoxide, and sodium silicate. Examples of the P source include phosphoric acid, phosphorus pentoxide, sodium dihydrogen phosphate, ammonium dihydrogen phosphate, and phosphoric ester. Examples of the Al source include sodium aluminate, aluminum hydroxide, aluminum alkoxide, and alumina sol. Examples of the SDA include amines and quaternary ammonium salt.

Then, the starting material solution is subjected to hydrothermal synthesis. The temperature during the hydrothermal synthesis is, for example, in the range of 110 to 200° C. The hydrothermal synthesis time is, for example, in the range of 5 to 100 hours. When the hydrothermal synthesis is completed, resultant crystals are rinsed with deionized water. Then, the rinsed crystals are dried to generate zeolite powder. The zeolite is, for example, an AEI-, AFX-, or SAT-type zeolite. The composition of the zeolite can be adjusted by control, for example, the mixing ratio of the raw materials (e.g., the Si source, the P source, and the Al source) in the starting material solution described above.

The zeolite powder may be used as-is as seed crystals, but it is preferable that the zeolite powder is processed by pulverization or any other method to acquire seed crystals with particle diameters adjusted in accordance with the pore diameters in the surface layer of the support 11 (e.g., seed crystals with an average particle diameter greater than the mean pore diameter in the surface layer of the support 11). The zeolite powder may be prepared by any other method.

Then, a porous support 11 is immersed in a dispersion liquid in which the seed crystals are dispersed, so as to cause the seed crystals to adhere to the support 11 (step S12). Alternatively, a dispersion liquid in which the seed crystals are dispersed may be brought into contact with a portion of the surface of the support 11 on which the zeolite membrane 12 is desired to be formed, in order to cause the seed crystals to adhere to the support 11. In this way, a seed-crystal-deposited support is prepared. The seed crystals may be caused to adhere to the support 11 by any other method.

Next, a starting material solution is prepared, in which the support 11 with the seed crystals adhering thereto is immersed (step S13). Like the starting material solution in step S11 (the synthesis of the seed crystals), the starting material solution is prepared by dissolving or dispersing, for example, an Si source, a P source, an Al source, and an SDA in a solvent. Specific examples of the Si source, the P source, the Al source, the SDA, and the solvent are the same as those in the starting material solution in step S11.

In step S13, for example, a precursor solution is prepared by adding, for example, an Si source, a P source, an Al source, and an SDA to a solvent with a pH higher than or equal to 5 and lower than or equal to 11 (step S131). Thereafter, the precursor solution is stirred for three hours or more on the condition that the temperature is higher than or equal to 10° C. and lower than or equal to 50° C. This reduces the particle diameters of the sol in the precursor solution and produces the aforementioned starting material solution containing a sol whose particle diameters are less than or equal to 500 nm (step S132). The particle diameters of the sol correspond to the median diameter D50 in the particle-size distribution obtained by laser scattering. In step S132, the precursor solution does not necessarily have to be stirred for three hours or more, and may be left at rest for three hours or more. In other words, in step S132, the precursor solution may be retained for three hours or more on the condition that the temperature is higher than or equal to 10° C. and lower than or equal to 50° C.

When step S13 has ended, the support 11 with the seed crystals adhering thereto is immersed in the starting material solution. Thereafter, the zeolite is grown by hydrothermal synthesis using the seed crystals on the support 11 as nuclei to form the zeolite membrane 12 on the support 11 (step S14). The temperature during the hydrothermal synthesis is, for example, in the range of 110 to 200° C. The hydrothermal synthesis time is, for example, in the range of 5 to 100 hours. In step S14, adequate synthesis conditions are selected according to the type of the zeolite to be formed, and zeolite crystal particles are grown in the membrane thickness direction, using the seed crystals as nuclei. As a result, the zeolite membrane 12 is formed in which a large number of zeolite crystal particles are densely packed and spread. Note that the types of the raw materials contained in the starting material solution in step S13 may be different from the types of the raw materials contained in the starting material solution in step S11.

When the hydrothermal synthesis has ended, the support 11 and the zeolite membrane 12 are rinsed with deionized water. The support 11 and the zeolite membrane 12 after the rinsing are dried at, for example, 100° C. After the drying of the support 11 and the zeolite membrane 12, the zeolite membrane 12 is subjected to heat treatment in an oxidizing gas atmosphere, so that the SDA in the zeolite membrane 12 burns almost completely and is detached and removed from grain boundaries or crystal surfaces (step S15). Accordingly, the microscopic pores in the zeolite membrane 12 penetrate through the zeolite membrane 12. The heating temperature during the removal of the SDA is, for example, in the range of 400 to 1000° C., preferably in the range of 400 to 900° C., and more preferably in the range of 400 to 800° C. The heating time is, for example, in the range of 10 to 200 hours. The oxidizing gas atmosphere is an atmosphere containing oxygen and may, for example, be under atmospheric pressure. Through the processing described above, the zeolite membrane complex 1 is obtained.

Figure 5:
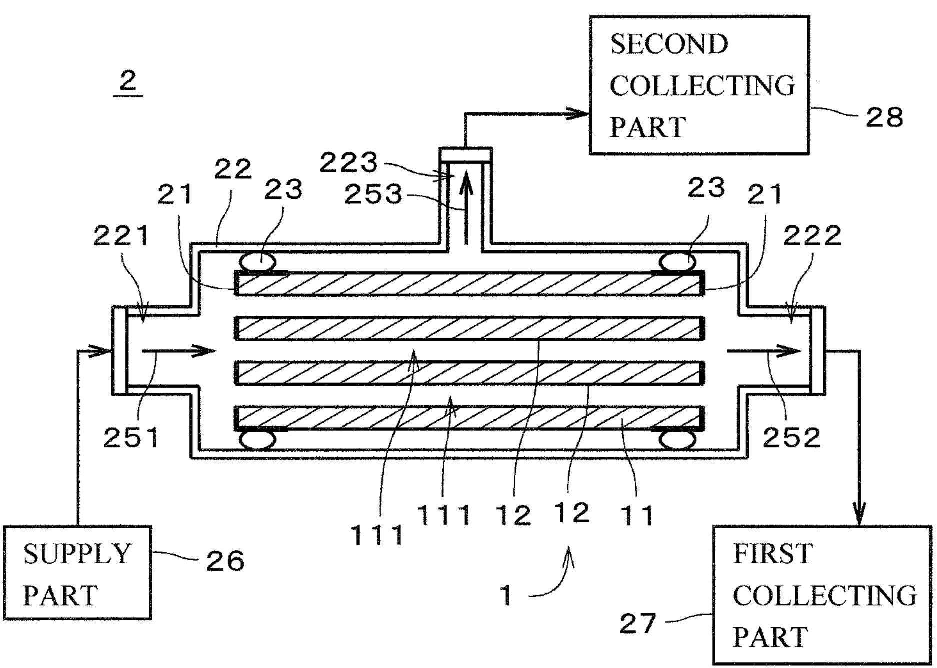
Figure 6:
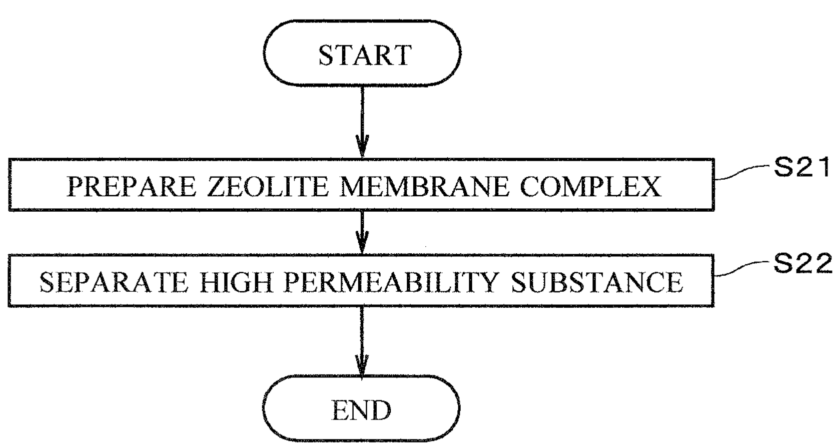
FIG. 6 is a flowchart of a procedure for separating a mixture of substances.

Next, the separation of a mixture of substances using the zeolite membrane complex 1 will be described with reference to FIGS. 5 and 6. FIG. 5 is an illustration of a separator 2. FIG. 6 is a flowchart of a procedure for separating a mixture of substances, performed by the separator 2.

In the separator 2, a mixture of substances including a plurality of types of fluids (i.e., gases or liquids) is supplied to the zeolite membrane complex 1, and a substance with high permeability in the mixture of substances is separated from the mixture of substances by allowing this substance to permeate through the zeolite membrane complex 1. For example, the separation by the separator 2 may be conducted for the purpose of extracting a substance with high permeability (hereinafter, also referred to as a "high permeability substance") from the mixture of substances, or for the purpose of condensing a substance with low permeability (hereinafter, also referred to as a "low permeability substance").

The mixture of substances (i.e., a mixed fluid) may be a mixed gas including a plurality of types of gases, or may be a mixed solution including a plurality of types of liquids, or may be a gas-liquid two-phase fluid including both gases and liquids.

The mixture of substances includes, for example, one or more types of substances selected from among hydrogen ($H_2$), helium (He), nitrogen ($N_2$), oxygen ($O_2$), water ($H_2O$), water vapor ($H_2O$), carbon monoxide (CO), carbon dioxide ($CO_2$), nitrogen oxides, ammonia ($NH_3$), sulfur oxides, hydrogen sulfide ($H_2S$), sulfur fluorides, mercury (Hg), arsine ($AsH_3$), hydrocyanic acid (HCN), carbonyl sulfide (COS), C1 to C8 hydrocarbons, organic acids, alcohol, mercaptans, ester, ether, ketone, and aldehyde. The aforementioned high permeability substance is, for example, one or more types of substances selected from among $CO_2$, $NH_3$, and $H_2O$ and is preferably $H_2O$.

Nitrogen oxides are compounds of nitrogen and oxygen. Examples of the aforementioned nitrogen oxides include gases called $NO_X$ such as nitrogen monoxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), and dinitrogen pentoxide ($N_2O_5$).

Sulfur oxides are compounds of sulfur and oxygen. Examples of the aforementioned sulfur oxides include gases called $SO_X$ such as sulfur dioxide ($SO_2$) and sulfur trioxide ($SO_3$).

Sulfur fluorides are compounds of fluorine and sulfur. Examples of the aforementioned sulfur fluorides include disulfur difluoride (F—S—S—F, S═$SF_2$), sulfur difluoride ($SF_2$), sulfur tetrafluoride ($SF_4$), sulfur hexafluoride ($SF_6$), and disulfur decafluoride ($S_2F_{10}$).

C1 to C8 hydrocarbons are hydrocarbons containing one or more and eight or less carbon atoms. C3 to C8 hydrocarbons each may be any of a linear-chain compound, a side-chain compound, and a cyclic compound. C2 to C8 hydrocarbons each may be either a saturated hydrocarbon (i.e., in the absence of a double bond and a triple bond in a molecule) or an unsaturated hydrocarbon (i.e., in the presence of a double bond and/or a triple bond in a molecule). Examples of C1 to C4 hydrocarbons include methane ($CH_4$), ethane ($C_2H_6$), ethylene ($C_2H_4$), propane ($C_3H_8$), propylene ($C_3H_6$), normal butane ($CH_3(CH_2)_2CH_3$), isobutane ($CH(CH_3)_3$), 1-butene ($CH_2$═$CHCH_2CH_3$), 2-butene ($CH_3CH$═$CHCH_3$), and isobutene ($CH_2$═$C(CH_3)_2$).

The aforementioned organic acids may, for example, be carboxylic acids or sulfonic acids. Examples of the carboxylic acids include formic acid ($CH_2O_2$), acetic acid ($C_2H_4O_2$), oxalic acid ($C_2H_2O_4$), acrylic acid ($C_3H_4O_2$), and benzoic acid ($C_6H_5COOH$). One example of the sulfonic acids is ethane sulfonic acid ($C_2H_6O_3S$). The organic acids may be either chain compounds or cyclic compounds.

Examples of the aforementioned alcohol include methanol ($CH_3OH$), ethanol ($C_2H_5OH$), isopropanol (2-propanol) ($CH_3CH(OH)CH_3$), ethylene glycol ($CH_2(OH)CH_2(OH)$), and butanol ($C_4H_9OH$).

The mercaptans are organic compounds with terminal sulfur hydrides (SH), and are substances also called thiol or thioalcohol. Examples of the aforementioned mercaptans include methyl mercaptans ($CH_3SH$), ethyl mercaptans ($C_2H_5SH$), and 1-propane thiol ($C_3H_7SH$).

Examples of the aforementioned ester include formic acid ester and acetic acid ester.

Examples of the aforementioned ether include dimethyl ether ($(CH_3)_2O$), methyl ethyl ether ($C_2H_5OCH_3$), and diethyl ether ($(C_2H_5)_2O$).

Examples of the aforementioned ketone include acetone ($(CH_3)_2CO$), methyl ethyl ketone ($C_2H_5COCH_3$), and diethyl ketone ($(C_2H_5)_2CO$).

Examples of the aforementioned aldehyde include acetaldehyde ($CH_3CHO$), propionaldehyde ($C_2H_5CHO$), butanal (butyraldehyde) ($C_3H_7CHO$).

The following description takes the example of the case where the mixture of substances to be separated by the separator 2 is a mixed solution including a plurality of types of liquids.

The separator 2 includes the zeolite membrane complex 1, sealers 21, an outer cylinder 22, two seal members 23, a supply part 26, a first collecting part 27, and a second collecting part 28. The zeolite membrane complex 1, the sealers 21, and the seal members 23 are included in the outer cylinder 22. The supply part 26, the first collecting part 27, and the second collecting part 28 are arranged outside the outer cylinder 22 and connected to the outer cylinder 22.

The sealers 21 are members that are mounted on both ends of the support 11 in the longitudinal direction (i.e., the right-left direction in FIG. 5) and that cover and seal both end faces of the support 11 in the longitudinal direction and the outside surface of the support 11 in the vicinity of the both end faces. The sealers 21 prevent the inflow and outflow of liquids from the both end faces of the support 11. The sealers 21 may, for example, be plate-like members formed of glass or resin. The material and shape of the sealers 21 may be adequately changed. Since the sealers 21 have a plurality of openings that overlap with the through holes 111 of the support 11, both ends of each through hole 111 of the support 11 in the longitudinal direction are not covered with the sealers 21. This allows the inflow and outflow of liquids or the like from the both ends to the through holes 111.

There are no particular limitations on the shape of the outer cylinder 22, but the outer cylinder 22 may be a generally cylindrical tube-like member. The outer cylinder 22 may be formed of, for example, stainless steel or carbon steel. The longitudinal direction of the outer cylinder 22 is approximately parallel to the longitudinal direction of the zeolite membrane complex 1. The outer cylinder 22 has a supply port 221 at its one end in the longitudinal direction (i.e., the end on the left side in FIG. 5) and a first exhaust port 222 at the other end. The side face of the outer cylinder 22 has a second exhaust port 223. The supply port 221 is connected to the supply part 26. The first exhaust port 222 is connected to the first collecting part 27. The second exhaust port 223 is connected to the second collecting part 28. The internal space of the outer cylinder 22 is an enclosed space isolated from the space around the outer cylinder 22.

The two seal members 23 are arranged around the entire circumference between the outside surface of the zeolite membrane complex 1 and the inside surface of the outer cylinder 22 in the vicinity of both ends of the zeolite membrane complex 1 in the longitudinal direction. Each seal member 23 is a generally ring-shaped member formed of a material that is impermeable to liquids. For example, the seal members 23 are O-rings formed of resin having flexibility. The seal members 23 are in tight contact with the outside surface of the zeolite membrane complex 1 and the inside surface of the outer cylinder 22 along the entire circumference. In the example illustrated in FIG. 5, the seal members 23 are in tight contact with the outside surfaces of the sealers 21 and are indirectly in tight contact with the outside surface of the zeolite membrane complex 1 via the sealers 21. A space between the seal members 23 and the outside surface of the zeolite membrane complex 1 and a space between the seal members 23 and the inside surface of the outer cylinder 22 are sealed so as to almost or completely disable the passage of liquids.

The supply part 26 supplies a mixed solution to the internal space of the outer cylinder 22 via the supply port 221. The supply part 26 includes, for example, a pump that pumps the mixed solution toward the outer cylinder 22 under pressure. The pump includes a temperature regulator and a pressure regulator that respectively control the temperature and pressure of the mixed solution that is supplied to the outer cylinder 22. The first collecting part 27 includes, for example, a reservoir that stores a liquid derived from the outer cylinder 22 or a pump that transfers the liquid. The second collecting part 28 includes, for example, a vacuum pump that reduces pressure in the space outside the outside surface of the zeolite membrane complex 1 in the outer cylinder 22 (i.e., the space sandwiched between the two seal members 23), and a liquid nitrogen trap that cools and liquefies gases that have evaporated and permeated through the zeolite membrane complex 1.

In the case of separating a mixed solution, the aforementioned separator 2 is provided to prepare the zeolite membrane complex 1 (step S21 in FIG. 6). Then, the supply part 26 supplies, to the internal space of the outer cylinder 22, a mixed solution including a plurality of types of liquids, each having different permeability in the zeolite membrane 12. For example, the mixed solution may be composed predominantly of water ($H_2O$) and ethanol ($C_2H_5OH$). The mixed solution may also contain liquids other than water and ethanol. The pressure of the mixed solution supplied from the supply part 26 to the internal space of the outer cylinder 22 (i.e., initial pressure) is, for example, in the range of 0.1 MPa to 2 MPa, and the temperature of the mixed solution is for example, in the range of 10° C. to 200° C.

The mixed solution supplied from the supply part 26 to the outer cylinder 22 is introduced from the left end of the zeolite membrane complex 1 in the drawing into each through hole 111 of the support 11, as indicated by arrow 251. A liquid with high permeability in the mixed solution, i.e., a high permeability substance, permeates through the zeolite membrane 12 formed on the inside surface of each through hole 111 and through the support 11 while evaporating, and is then derived out from the outside surface of the support 11. Accordingly, the high permeability substance (e.g., water) is separated from a liquid with low permeability in the mixed solution, i.e., a low permeability substance (e.g., ethanol) (step S22).

The gas derived out from the outside surface of the support 11 (hereinafter, referred to as a "permeated substance") is guided through the second exhaust port 223 to the second collecting part 28 as indicated by arrow 253 and is cooled and collected as a liquid in the second collecting part 28. The pressure of the gas collected by the second collecting part 28 through the second exhaust port 223 (i.e., permeation pressure) is, for example, approximately 50 Torr (approximately 6.67 kPa). The permeated substance may further contain, in addition to the aforementioned high permeability substance, a low permeability substance that has permeated through the zeolite membrane 12.

In the mixed solution, a liquid (hereinafter, referred to as a "non-permeated substance") other than the substances that have permeated through the zeolite membrane 12 and the support 11 passes through each through hole 111 of the support 11 from the left side to the right side in the drawing and is collected by the first collecting part 27 through the first exhaust port 222 as indicated by arrow 252. The pressure of the liquid collected by the first collecting part 27 through the first exhaust port 222 is, for example, approximately the same as the initial pressure. The non-permeated substance may further include, in addition to the aforementioned low permeability substance, a high permeability substance that has not permeated through the zeolite membrane 12. The non-permeated substance collected by the first collecting part 27 may, for example, be circulated to the supply part 26 and supplied again into the outer cylinder 22.

For example, the separator 2 illustrated in FIG. 5 may be used as a membrane reactor. In this case, the outer cylinder 22 is used as a reactor. The outer cylinder 22 includes a catalyst that accelerates chemical reactions of starting materials supplied from the supply part 26. For example, the catalyst may be arranged between the supply port 221 and the first exhaust port 222. Preferably, the catalyst may be arranged in the vicinity of the zeolite membrane 12 of the zeolite membrane complex 1. The catalyst to be used is made of an adequate material and has an adequate shape according to the types of the starting materials and the types of chemical reactions of the starting materials. The starting materials include one type or two or more types of substances. In order to accelerate the chemical reactions of the starting materials, the membrane reactor may further include a heater for heating the reactor (i.e., outer cylinder 22) and/or the starting materials.

In the separator 2 used as a membrane reactor, a mixture of substances containing a product substance generated by chemical reactions of the starting materials in the presence of the catalyst is supplied to the zeolite membrane 12 in the same manner as described above, a high permeability substance in the mixture of substances permeates through the zeolite membrane 12, and as a result of this, the high permeability substance is separated from the other substances having lower permeability than the high permeability substrate. For example, the mixture of substances may be a fluid that contains the product substance and starting materials that are not reacted. Alternatively, the mixture of substances may contain two or more types of product substances. The high permeability substance may be a product substance generated from the starting materials, or may be a substance other than the product substance. Preferably, the high permeability substance includes one or more types of product substances.

When the high permeability substance is a product substance generated from the starting materials, the yield of the product substance can be improved by separating the product substance from the other substances through the zeolite membrane 12. When the mixture of substances includes two or more types of product substances, these two or more types of product substances may be high permeability substances, or only some of these types of products substances may be high permeability substances.

Next, the relationship between the composition of the zeolite membrane 12 and selectivity of the zeolite membrane complex 1 will be described. The selectivity was obtained from a permeated substance (i.e., permeated liquid) in the aforementioned separator 2 in which a mixed solution of water and ethanol was supplied from the supply part 26 to the zeolite membrane complex 1 in the outer cylinder 22, and the permeated substance that had permeated through the zeolite membrane complex 1 was collected by the second collecting part 28. Specifically, the selectivity refers to a value (i.e., a separation ratio of water and ethanol) obtained by dividing the concentration of water (percent by mass) in the permeated substance collected by the second collecting part 28 by the concentration of ethanol (percent by mass) in the permeated substance collected by the second collecting part 28. The temperature of the mixed solution supplied from the supply part 26 was set to 60° C., and the ratio of water and ethanol in the mixed solution was set to 50 percent by mass, respectively.

In Example 1, the zeolite membrane complex 1 was prepared as follows. First, SAT-type zeolite powder obtained by hydrothermal synthesis was used as seed crystals, and the seed crystals were caused to adhere to the inside of each through hole 111 by bringing the support 11 into contact with a liquid in which the seed crystals and deionized water are added to have a predetermined mixing ratio.

Then, 30 percent by mass of colloidal silica, aluminum isopropoxide, 85% of phosphoric acid, and 1,4-diazabicyclo [2,2,2]otane-C4-diquat hydroxide were dissolved or dispersed, respectively, as an Si source, an Al source, a P source, and an SDA in deionized water to prepare a precursor solution. Then, the precursor solution was stirred at room temperature for four hours to generate a starting material solution. Particle diameters of a sol in the precursor solution were less than or equal to 500 nm. The starting material solution had a composition of 0.1 $SiO_2$: 1 $Al_2O_3$: 2 $P_2O_5$: 2.3 SDA: 1000$H_2O$.

Next, the support 11 with the seed crystals adhering thereto was immersed in the starting material solution and subjected to hydrothermal synthesis at 170° C. for 50 hours to form an SAT-type zeolite membrane 12 on the support 11. Then, the support 11 with the zeolite membrane 12 formed thereon was rinsed enough with deionized water and dried completely at 90° C. Then, the support 11 with the zeolite membrane 12 formed thereon was heated at 500° C. for 20 hours in the atmosphere so as to remove the SDA by combustion and to cause small pores in the zeolite membrane 12 to penetrate through the zeolite membrane 12.

As a result of measuring the surface composition of the zeolite membrane 12 of Example 1 by XPS described above, the Si/Al ratio was 0.10, the P/Al ratio was 0.92, and the (Si+P)/Al ratio was 1.02. The separation ratio of water and ethanol in the zeolite membrane 12 of Example 1 was 1039, and high selectivity was exhibited.

For the zeolite membrane 12 of Example 1, the permeance of a single component $CF_4$ was measured under a pressure of 0.5 MPa on the supply side and a pressure of 0.1 MPa on the permeation side, and the permeance of a single component helium was measured under a pressure of 0.2 MPa on the supply side and a pressure of 0.1 MPa on the permeation side. The ratio of the obtained helium permeance to the obtained $CF_4$ permeance was higher than or equal to 500.

The production of the zeolite membrane complex 1 in Example 2 was conducted in approximately the same manner as in Example 1, except that the starting material solution had a composition of 0.3 $SiO_2$: 1 $Al_2O_3$: 2 $P_2O_5$: 2.3 SDA: 1000$H_2O$. As a result of measuring the surface composition of the zeolite membrane 12 of Example 2 by XPS described above, the Si/Al ratio was 0.28, the P/Al ratio was 0.74, and the (Si+P)/Al ratio was 1.03. The separation ratio of water and ethanol in Example 2 was 968, and high selectivity was exhibited. The ratio of the helium permeance to the $CF_4$ permeance in Example 2 was higher than or equal to 500. In Example 2 and in Examples 3 to 5 and Comparative Examples 1 and 2 described later, conditions for measuring the $CF_4$ permeance and the helium permeance were the same as those in Example 1.

The production of the zeolite membrane complex 1 in Example 3 was conducted in approximately the same manner as in Example 1, except that the starting material solution had a composition of 0.5 $SiO_2$: 1 $Al_2O_3$: 2 $P_2O_5$: 2.3 SDA: 1000$H_2O$. As a result of measuring the surface composition of the zeolite membrane 12 of Example 3 by XPS described above, the Si/Al ratio was 0.49, the P/Al ratio was 0.56, and the (Si+P)/Al ratio was 1.05. The separation ratio of water and ethanol in Example 3 was 832, and high selectivity was exhibited. The ratio of the helium permeance to the $CF_4$ permeance in Example 3 was higher than or equal to 500.

The production of the zeolite membrane complex 1 in Example 4 was conducted in approximately the same manner as in Example 1, except that titanium isopropoxide was used as a Ti source and that the starting material solution had a composition of 0.1 $TiO_2$: 1 $Al_2O_3$: 2 $P_2O_5$: 2.3 SDA: 1000$H_2O$. As a result of measuring the surface composition of the zeolite membrane 12 of Example 4 by XPS described above, the Ti/Al ratio was 0.08, the P/Al ratio was 0.93, and the (Ti+P)/Al ratio was 1.01. The separation ratio of water and ethanol in Example 4 was 926, and high selectivity was exhibited. The ratio of the helium permeance to the $CF_4$ permeance in Example 4 was higher than or equal to 500.

In Example 5, the zeolite membrane complex 1 was prepared as follows. First, AFX-type zeolite powder obtained by hydrothermal synthesis was used as seed crystals, and the seed crystals were caused to adhere to the inside of each through hole 111 by bringing the support 11 into contact with a liquid in which the seed crystals and deionized water are added to have a predetermined mixing ratio.

Then, 30 percent by mass of colloidal silica, aluminum isopropoxide, 85% of phosphoric acid, and N,N,N',N'-tetramethyl-diamino-hexane were dissolved, respectively, as an Si source, an Al source, a P source, and an SDA in deionized water to prepare a precursor solution. Then, the precursor solution was stirred at room temperature for four hours to generate a starting material solution. Particle diameters of a sol in the precursor solution were less than or equal to 500 nm. The starting material solution had a composition of 1.7 $SiO_2$: 1 $Al_2O_3$: 2 $P_2O_5$: 4 SDA: $1000H_2O$.

Then, the support 11 with the seed crystals adhering thereto was immersed in the starting material solution and subjected to hydrothermal synthesis at 170° C. for 50 hours so as to form an AFX-type zeolite membrane 12 on the support 11. Then, the support 11 with the zeolite membrane 12 formed thereon was rinsed enough with deionized water and dried completely at 90° C. Then, the support 11 with the zeolite membrane 12 formed thereon was heated at 500° C. for 20 hours in the atmosphere to remove the SDA by combustion and to cause small pores in the zeolite membrane 12 to penetrate through the zeolite membrane 12.

As a result of measuring the surface composition of the zeolite membrane 12 in Example 5 by XPS described above, the Si/Al ratio was 0.20, the P/Al ratio was 0.87, and the (Si+P)/Al ratio was 1.07. The separation ratio of water and ethanol in Example 5 was 753, and high selectivity was exhibited. The ratio of the helium permeance to the $CF_4$ permeance in Example 5 was higher than or equal to 500.

In Example 6, the zeolite membrane complex 1 was prepared as follows. First, AEI-type zeolite powder obtained by hydrothermal synthesis was used as seed crystals, and the seed crystals were caused to adhere to the inside of each through hole 111 by bringing the support 11 into contact with a liquid in which the seed crystals and deionized water are added to have a predetermined mixing ratio.

Then, 30 percent by mass of colloidal silica, aluminum isopropoxide, 85% of phosphoric acid, and 35 percent by mass of tetraethylammonium hydroxide were dissolved, respectively, as an Si source, an Al source, a P source, and an SDA in deionized water to prepare a precursor solution. Then, the precursor solution was stirred at room temperature for four hours to generate a starting material solution. Particle diameters of a sol in the precursor solution were less than or equal to 500 nm. The starting material solution had a composition of 0.2 $SiO_2$: 1 $Al_2O_3$: 3 $P_2O_5$: 6 SDA: $1000H_2O$.

Then, the support 11 with the seed crystals adhering thereto was immersed in the starting material solution and subjected to hydrothermal synthesis at 180° C. for 30 hours to form an AEI-type zeolite membrane 12 on the support 11. Then, the support 11 with the zeolite membrane 12 formed thereon was rinsed enough with deionized water and dried completely at 90° C. Then, the support 11 with the zeolite membrane 12 formed thereon was heated at 500° C. for 20 hours in the atmosphere to remove the SDA by combustion and to cause small pores in the zeolite membrane 12 to penetrate through the zeolite membrane 12.

As a result of measuring the surface composition of the zeolite membrane 12 in Example 6 by XPS described above, the Si/Al ratio was 0.16, the P/Al ratio was 0.89, and the (Si+P)/Al ratio was 1.05. The separation ratio of water and ethanol in Example 6 was 2543, and high selectivity was exhibited. The ratio of the helium permeance to the $CF_4$ permeance in Example 6 was higher than or equal to 500.

The production of the zeolite membrane complex 1 in Comparative Example 1 was conducted in approximately the same manner as in Example 1, except that the time for stirring the precursor solution was reduced to 15 minutes. In Comparative Example 1, particle diameters of a sol in the precursor solution were greater than 500 nm. As a result of measuring the surface composition of the zeolite membrane 12 in Comparative Example 1 by XPS described above, the Si/Al ratio was 0.10, the P/Al ratio was 1.04, and the (Si+P)/Al ratio was 1.14. The separation ratio of water and ethanol in Comparative Example 1 was lower than or equal to 20, and low selectivity was exhibited. The ratio of the helium permeance to the $CF_4$ permeance in Comparative Example 1 was lower than 100.

The production of the zeolite membrane complex 1 in Comparative Example 2 was conducted in approximately the same manner as in Example 2, except that the time for stirring the precursor solution was reduced to 15 minutes. In Comparative Example 2, particle diameters of a sol in the precursor solution were greater than 500 nm. As a result of measuring the surface composition of the zeolite membrane 12 in Comparative Example 2 by XPS described above, the Si/Al ratio was 0.64, the P/Al ratio was 1.01, and the (Si+P)/Al ratio was 1.65. The separation ratio of water and ethanol in Comparative Example 2 was lower than or equal to 10, and low selectivity was exhibited. The ratio of the helium permeance to the $CF_4$ permeance in Comparative Example 2 was lower than 100.

It has also been confirmed that the zeolite membrane complex s 1 produced in approximately the same manner as in Example 1 or 3 by changing the composition of the starting material solution exhibit high selectivity when the composition of the zeolite membrane 12 measured by X-ray photoelectron spectroscopy satisfies the following conditions: the molar ratio of Si to Al is higher than or equal to 0.01 and lower than or equal to 0.5, the molar ratio of P to Al is higher than or equal to 0.5 and lower than 1.0, and the total molar ratio of Si and P to Al is higher than or equal to 0.9 and lower than or equal to 1.3.

As described above, the zeolite membrane complex 1 includes the porous support 11 and the zeolite membrane 12 formed on the support 11. The zeolite membrane 12 contains Al, P, and a tetravalent element. The composition of the zeolite membrane 12 measured by X-ray photoelectron spectroscopy is such that the molar ratio of the tetravalent element to Al is higher than or equal to 0.01 and lower than or equal to 0.5, the molar ratio of P to Al is higher than or equal to 0.5 and lower than 1.0, and the total molar ratio of P and the tetravalent element to Al is higher than or equal to 0.9 and lower than or equal to 1.3.

In this way, in the zeolite membrane complex 1, the zeolite membrane 12 composed predominantly of Al and P is configured such that the pentavalent P site is replaced by a tetravalent element more preferentially than the trivalent Al site. In other words, the pentavalent P site is selectively replaced by a tetravalent element in the zeolite membrane 12. Thus, the zeolite membrane 12 exhibits improved affinity with polar molecules. As a result, it is possible to improve the permeability of polar molecules in the zeolite membrane 12.

As described above, the composition of the zeolite membrane 12 measured by X-ray photoelectron spectroscopy is preferably such that the molar ratio of the tetravalent element to Al is higher than or equal to 0.01 and lower than or equal to 0.3 and the molar ratio of P to Al is higher than or equal to 0.7 and lower than 1.0. In this case, the zeolite membrane exhibits improved durability against water.

When the aforementioned composition of the zeolite membrane 12 is measured by energy dispersive X-ray spectrometry (EDX or EDS), the molar ratio of the above tetravalent element to Al is higher than or equal to 0.01 and lower than or equal to 0.45, the molar ratio of P to Al is higher than or equal to 0.45 and lower than 1.0, and the total molar ratio of P and the above tetravalent element to Al is higher than or equal to 0.8 and lower than or equal to 1.2. Conditions for the EDX (EDS) measurement include an acceleration voltage of 10 kV, the use of a silicon drift detector as a detector, and the field of view at 5000× magnification. However, EDX (EDS) is a composition evaluation method for evaluating not only the membrane surface but also the membrane interior. Thus, evaluation results may vary depending also on conditions for producing the zeolite membrane 12. On the other hand, X-ray photoelectron spectroscopy can evaluate composition information as to only the membrane surface that most affects the selectivity of the zeolite membrane 12. Therefore, it is difficult to prove a direct correlation between the results of measurement by X-ray photoelectron spectroscopy and the results of measurement by EDX (EDS), and caution is necessary.

As described above, the zeolite crystals contained in the zeolite membrane 12 have pore diameters less than or equal to 0.4 nm. Accordingly, it is possible to favorably achieve selective permeation of to-be-permeated substances having small molecular sizes and efficient separation of the to-be-permeated substances from a mixture of substances.

As described above, the zeolite membrane 12 is composed of an AEI-, AFX-, or SAT-type zeolite. In this way, when the zeolite membrane is composed of zeolite crystals with relatively small pore diameters, it is possible to favorably achieve selective permeation of to-be-permeated substances with small molecular sizes and efficient separation of the to-be-permeated substances from a mixture of substances.

As described above, the tetravalent element described above is preferably one or more types of elements selected from among Si and Ti, and more preferably Si. This further improves the permeability of polar molecules in the zeolite membrane 12.

As described above, in the zeolite membrane complex 1, the ratio of the helium permeance to the $CF_4$ permeance is preferably higher than or equal to 500, the helium permeance being measured with a single component helium under a pressure of 0.2 MPa on the supply side and a pressure of 0.1 MPa on the permeation side, and the $CF_4$ permeance being measured with a single component $CF_4$ under a pressure of 0.5 MPa on the supply side and a pressure of 0.1 MPa on the permeation side. Accordingly, it is possible to favorably achieve selective permeation of to-be-permeated substances with small molecular sizes and efficient separation of the to-be-permeated substances from a mixture of substances.

As described above, the support 11 is preferably an alumina sintered body, a mullite sintered body, or a titania sintered body. This improves the adhesion of the zeolite membrane 12 and the support 11.

The above-described method of producing the zeolite membrane complex 1 includes the step of preparing a precursor solution by adding at least an Al source, a P source, and an SDA to a solvent (step S131), the step of generating a starting material solution containing a sol whose particle diameters are less than or equal to 500 nm, by retaining the precursor solution for three hours or more on conditions that the pH is higher than or equal to 5 and lower than or equal to 11 and that the temperature is higher than or equal to 10° C. and lower than or equal to 50° C. (step S132), and the step of immersing a porous support in the starting material solution to synthesize the zeolite membrane 12 on the support 11 by hydrothermal synthesis. The zeolite membrane 12 contains Al, P, and a tetravalent element. The composition of the zeolite membrane 12 measured by X-ray photoelectron spectroscopy is such that the molar ratio of the tetravalent element to Al is higher than or equal to 0.01 and lower than or equal to 0.5, the molar ratio of P to Al is higher than or equal to 0.5 and lower than 1.0, and the total molar ratio of P and the tetravalent element to Al is higher than or equal to 0.9 and lower than or equal to 1.3. Accordingly, it is possible to provide the zeolite membrane complex 1 that includes the zeolite membrane 12 with improved permeability of polar molecules.

As described above, the separator 2 includes the zeolite membrane complex 1 described above and the supply part 26 that supplies a mixture of substances including a plurality of types of gases or liquids to the zeolite membrane complex 1. The zeolite membrane complex 1 separates a high permeability substance having high permeability in a mixture of substances from other substances by allowing the high permeability substance to permeate through the zeolite membrane complex 1. Accordingly, it is possible to efficiently separate a high permeability substance as polar molecules from other substances. The separator 2 is thus suitable for use in the separation of one or more types of substances selected from among $CO_2$, $NH_3$, and $H_2O$, and in particular suitable for use in the separation of $H_2O$.

As described above, the membrane reactor includes the zeolite membrane complex 1 described above, the catalyst that accelerates chemical reactions of starting materials, the reactor (in the aforementioned example, the outer cylinder 22) that includes the zeolite membrane complex 1 and the catalyst, and the supply part 26 that supplies starting materials to the reactor. The zeolite membrane complex 1 separates a high permeability substance having high permeability in a mixture of substances from other substances by allowing the high permeability substance to permeate through the zeolite membrane complex 1, the mixture of substances containing a product substance generated by chemical reactions of starting materials in the presence of the catalyst. Accordingly, it is possible to efficiently separate a high permeability substance as polar molecules from other substances in the same manner as described above. The membrane reactor is thus suitable for use in the separation of one or more types of substances selected from among $CO_2$, $NH_3$, and $H_2O$ and in particular suitable for use in the separation of $H_2O$.

The separation method described above includes the step of preparing the zeolite membrane complex 1 described above (step S21), and the step of supplying a mixture of substances including a plurality of types of gases or liquids to the zeolite membrane complex 1 and separating a high permeability substance having high permeability in the mixture of substances from other substances by allowing the high permeability substance to permeate through the zeolite membrane complex 1 (step S22). Accordingly, it is possible to efficiently separate a high permeability substance as polar molecules from other substances in the same manner as described above. The separation method is thus suitable for use in the separation of one or more types of substances selected from among $CO_2$, $NH_3$, and $H_2O$ and in particular suitable for use in the separation of $H_2O$.

The zeolite membrane complex 1, the method of producing the zeolite membrane complex 1, the separator 2, the membrane reactor, and the separation method described above may be modified in various ways.

For example, the above-described tetravalent element contained in the zeolite membrane 12 may be an element other than Si, Ge, Ti, and Zr.

When an element contained in the zeolite membrane 12 is also contained in the support 11 and if the tetravalent element elutes from the support 11 during the formation of the zeolite membrane 12 described above (step S14 in FIG. 3), the eluted tetravalent element may also be used as an element of the zeolite membrane 12. In that case, the starting material solution prepared in step S13 does not necessarily have to contain this element.

The pore diameters (i.e., minor axes) in the zeolite crystals contained in the zeolite membrane 12 may be greater than 0.4 nm. A maximum number of membered rings in the zeolite crystals contained in the zeolite membrane 12 may be greater than 8.

The production of the zeolite membrane complex 1 may omit the processing for causing the seed crystals to adhere to the surface of the support 11 (steps S11 and S12 in FIG. 3) and may involve directly forming the zeolite membrane 12 on the support 11 through the processing in steps S13 and S14. Meanwhile, in order to facilitate the formation of the zeolite membrane 12 in which zeolite crystal particles are densely packed, it is preferable that the seed crystals are caused to adhere to the support 11 before the formation of the zeolite membrane 12.

The zeolite membrane complex 1 may further include, in addition to the support 11 and the zeolite membrane 12, a functional membrane or a protection membrane that is laminated on the zeolite membrane 12. Such a functional or protection membrane may be an inorganic membrane such as a zeolite membrane, a silica membrane, or a carbon membrane, or may be an organic membrane such as a polyimide membrane or a silicone membrane. Alternatively, a substance that can easily adsorb water may be added to the functional or protection membrane laminated on the zeolite membrane 12.

In the separator 2 and the separation method, the separation of a mixture of substances may be conducted by a different method such as vapor permeation, reverse osmosis, or gas permeation other than the pervaporation described above. The same applies to the membrane reactor.

In the separator 2 and the separation method, a substance other than those exemplified in the description given above may be separated from a mixture of substances. The same applies to the membrane reactor.

The constitutions of the above-described preferred embodiments and the variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

INDUSTRIAL APPLICABILITY

The zeolite membrane complex according to the present invention is applicable as, for example, a dehydrating membrane and is also applicable as a membrane such as a separation membrane for separating various substances other than water or an adsorption membrane for adsorbing various substances in various fields using zeolites.

REFERENCE SIGNS LIST

1 Zeolite membrane complex
2 Separator
11 Support
12 Zeolite membrane
26 Supply part
S11 to S15, S21 to S22, S131 to S132 Step

The invention claimed is:

1. A zeolite membrane complex comprising:

a porous support; and a zeolite membrane formed on said support from a starting material solution containing a sol whose particle diameters are less than or equal to 500 nm, wherein said zeolite membrane contains aluminum, phosphorus, and a tetravalent element, and said zeolite membrane is composed of an AEI, AFX, AFV, GIS or SAT zeolite, and a composition of said zeolite membrane measured by X-ray photoelectron spectroscopy is such that:

a molar ratio of said tetravalent element to said aluminum is higher than or equal to 0.01 and lower than or equal to 0.5;

a molar ratio of said phosphorus to said aluminum is higher than or equal to 0.5 and lower than 1.0; and a total molar ratio of said tetravalent element and said phosphorus to said aluminum is higher than or equal to 0.9 and lower than or equal to 1.3, and said zeolite membrane contains a zeolite crystal with an accessible volume higher than or equal to 450 $Å^3$.

2. The zeolite membrane complex according to claim 1, wherein the composition of said zeolite membrane measured by X-ray photoelectron spectroscopy is such that:

the molar ratio of said tetravalent element to said aluminum is higher than or equal to 0.01 and lower than or equal to 0.3; and the molar ratio of said phosphorus to said aluminum is higher than or equal to 0.7 and lower than 1.0.

3. The zeolite membrane complex according to claim 1, wherein said zeolite membrane contains a zeolite crystal with a pore diameter less than or equal to 0.4 nm.

4. The zeolite membrane complex according to claim 1, wherein said tetravalent element is one or more elements selected from silicon and titanium.

5. The zeolite membrane complex according to claim 4, wherein said tetravalent element is silicon.

6. The zeolite membrane complex according to claim 1, wherein a ratio of a helium permeance to a $CF_4$ permeance is higher than or equal to 500, said helium permeance being measured with a single component helium under a pressure of 0.2 MPa on a supply side and a pressure of 0.1 MPa on a permeation side, and said $CF_4$ permeance being measured with a single component $CF_4$ under a pressure of 0.5 MPa on the supply side and a pressure of 0.1 MPa on the permeation side.

7. The zeolite membrane complex according to claim 1, wherein said support is an alumina sintered body, a mullite sintered body, or a titania sintered body.

8. A method of producing a zeolite membrane complex, comprising:

a) preparing a precursor solution by adding at least an aluminum source, a phosphorus source, and a structure-directing agent to a solvent;

b) generating a starting material solution containing a sol whose particle diameters are less than or equal to 500 nm, by retaining said precursor solution for 3 hours or more on conditions that a pH is higher than or equal to 5 and lower than or equal to 11 and that a temperature is higher than or equal to 10° C. and lower than or equal to 50° C.; and c) immersing a porous support in said starting material solution to form a zeolite membrane on said support by hydrothermal synthesis, wherein said zeolite membrane contains aluminum, phosphorus, and a tetravalent element, and said zeolite membrane is composed of an AEI, AFX, AFV, GIS or SAT zeolite, and a composition of said zeolite membrane measured by X-ray photoelectron spectroscopy is such that:

a molar ratio of said tetravalent element to said aluminum is higher than or equal to 0.01 and lower than or equal to 0.5;

a molar ratio of said phosphorus to said aluminum is higher than or equal to 0.5 and lower than 1.0;

a total molar ratio of said tetravalent element and said phosphorus to said aluminum is higher than or equal to 0.9 and lower than or equal to 1.3; and said zeolite membrane contains a zeolite crystal with an accessible volume higher than or equal to 450 $Å^3$.

9. A separator comprising:

the zeolite membrane complex according to claim 1; and a supply part that supplies a mixture of substances containing a plurality of types of gases or liquids to said zeolite membrane complex, wherein said zeolite membrane complex separates a high permeability substance having high permeability in said mixture of substances from other substances.

10. The separator according to claim 9, wherein said high permeability substance is one or more types of substances selected from among $NH_3$, $CO_2$, and $H_2O$.

11. The separator according to claim 10, wherein said high permeability substance is $H_2O$.

12. A membrane reactor, comprising:

the zeolite membrane complex according to claim 1;

a catalyst that accelerates a chemical reaction of a starting material;

a reactor that includes said zeolite membrane complex and said catalyst; and a supply part that supplies said starting material to said reactor, wherein said zeolite membrane complex separates a high permeability substance having high permeability in a mixture of substances from other substances by allowing said high permeability substance to permeate through said zeolite membrane complex, the mixture of substances containing a product substance generated by a chemical reaction of said starting material in the presence of said catalyst.

13. The membrane reactor according to claim 12, wherein said high permeability substance is one or more types of substances selected from among $NH_3$, $CO_2$, and $H_2O$.

14. The membrane reactor according to claim 13, wherein said high permeability substance is $H_2O$.

15. A separation method comprising:

a) preparing the zeolite membrane complex according to claim 1; and b) supplying a mixture of substances containing a plurality of types of gases or liquids to said zeolite membrane complex and separating a high permeability substance having high permeability in said mixture of substances from other substances by allowing said high permeability substance to permeate through said zeolite membrane complex.

16. The separation method according to claim 15, wherein said high permeability substance is one or more types of substances selected from among $NH_3$, $CO_2$, and $H_2O$.

17. The separation method according to claim 16, wherein said high permeability substance is $H_2O$.

* * * * *